(12) United States Patent
Auranen et al.

(10) Patent No.: US 7,787,548 B2
(45) Date of Patent: *Aug. 31, 2010

(54) DIGITAL BROADCAST SERVICE DISCOVERY CORRELATION

(75) Inventors: Tommi Auranen, Turku (FI); Harri J. Pekonen, Raisio (FI); Jussi Vesma, Turku (FI); Pekka Talmola, Turku (FI); Jukka Henriksson, Espoo (FI); Visa Koivunen, Espoo (FI); Jani Vare, Kaarina (FI)

(73) Assignee: Nokia Corporation, Espoo (FI)

( * ) Notice: Subject to any disclaimer, the term of this patent is extended or adjusted under 35 U.S.C. 154(b) by 679 days.

This patent is subject to a terminal disclaimer.

(21) Appl. No.: 11/686,636

(22) Filed: Mar. 15, 2007

(65) Prior Publication Data

US 2008/0225995 A1 Sep. 18, 2008

(51) Int. Cl.
*H04K 1/10* (2006.01)
(52) U.S. Cl. ..................................... 375/260
(58) Field of Classification Search ................... 375/260
See application file for complete search history.

(56) References Cited

U.S. PATENT DOCUMENTS

| | | | | |
|---|---|---|---|---|
| 5,596,582 A * | 1/1997 | Sato et al. | | 370/509 |
| 5,818,813 A | 10/1998 | Saito et al. | | |
| 5,867,478 A * | 2/1999 | Baum et al. | | 370/203 |
| 6,035,003 A * | 3/2000 | Park et al. | | 375/326 |
| 6,115,354 A * | 9/2000 | Weck | | 370/203 |
| 6,414,936 B1 * | 7/2002 | Cho et al. | | 370/208 |
| 6,487,252 B1 * | 11/2002 | Kleider et al. | | 375/260 |
| 7,027,464 B1 * | 4/2006 | Nakahara et al. | | 370/503 |
| 7,251,291 B1 | 7/2007 | Dubuc et al. | | |
| 7,529,308 B2 | 5/2009 | Kodama et al. | | |

(Continued)

FOREIGN PATENT DOCUMENTS

EP 0689313 12/1995

(Continued)

OTHER PUBLICATIONS

Faria, "DVB-H: Digital Broadcast Services to Handheld Devices", Proceedings of the IEEE vol. 94, Issue 1, Jan. 2006 pp. 194 -209.*

(Continued)

*Primary Examiner*—Juan A Torres
(74) *Attorney, Agent, or Firm*—Banner & Witcoff Ltd.

(57) ABSTRACT

Aspects of the invention are directed to service and channel discovery in a digital broadcast network. A pilot synchronization symbol, which has known characteristics, is included as a first symbol of digital broadcast frames. The pilot symbol, which can be decoded without having to resort to trial and error methods, contains parameters for the rest of the signal. So, the rest of the signal can be decoded without trial and error methods after the pilot symbol (and any additional synchronization symbols) is decoded. Channels containing digital video broadcast services can be efficiently detected using the known part of the signal. If the fixed known part is not found from the examined signal, then the signal will be considered a non-digital-video-broadcast signal or an empty channel, and the receiver can promptly proceed to a next channel/frequency. In this way, detecting non-digital-video-broadcast and empty channels becomes relatively fast.

28 Claims, 12 Drawing Sheets

| Pilot Symbol 1 coarse frequency and time synchronization, FFT, GI, and modulation fixed 1102 | Signaling Symbol 2 modulation parameters and other signaling data, FFT, GI, and modulation fixed 1104 | Signaling Symbol 3 channel esimtation and fine timing 1106 | Data Symbol 1 1108 | Data Symbol 2 1110 |
|---|---|---|---|---|

U.S. PATENT DOCUMENTS

| | | | |
|---|---|---|---|
| 7,532,563 | B1 | 5/2009 | Shirali et al. |
| 2004/0059988 | A1 | 3/2004 | Murakami et al. |
| 2004/0141457 | A1* | 7/2004 | Seo et al. ............... 370/203 |
| 2004/0181799 | A1* | 9/2004 | Lu et al. ............... 725/18 |
| 2005/0163262 | A1 | 7/2005 | Gupta |
| 2005/0163265 | A1 | 7/2005 | Gupta |
| 2006/0062316 | A1* | 3/2006 | Kim ............... 375/260 |
| 2006/0244865 | A1* | 11/2006 | Simon ............... 348/614 |
| 2007/0116166 | A1* | 5/2007 | Parts et al. ............... 375/354 |
| 2007/0217547 | A1 | 9/2007 | Tani |
| 2008/0069263 | A1 | 3/2008 | Murakami et al. |

FOREIGN PATENT DOCUMENTS

| | | |
|---|---|---|
| EP | 0762701 | 3/1997 |
| EP | 1367789 | 12/2003 |
| EP | 1750374 | 2/2007 |

OTHER PUBLICATIONS

Moose, "A technique for orthogonal frequency division multiplexing frequency offset correction," IEEE Trans. Commun., vol. 42, pp. 2908-2914, Oct. 1994.*

Schmidl, "Robust frequency and timing synchronization for OFDM," IEEE Trans. Commun., vol. 45, pp. 1613-1621, Dec. 1997.* van de Beek, "ML estimation of time and frequency offset in OFDM systems," IEEE Trans. Signal Processing, vol. 45, pp. 1800-1805, Jul. 1997.*

Pollet, "BER sensitivity of OFDM systems to carrier frequency offset and Weiner phase noise," IEEE Trans. Commun., vol. 43, pp. 191-193, Feb. 1995.* van de Beek, "Low-complex frame synchronization in OFDM systems," in Proc. ICUPC, Nov. 1995, pp. 982-986.*

Coulson, "Maximum likelihood synchronization for OFDM using pilot symbol: Analysis," IEEE J. Select. Areas Commun., vol. 19, pp. 2495-2503, Dec. 2001.*

Gansman, "Optimum and suboptimum frame synchronization for pilot-symbol-assisted modulation," IEEE Trans. Commun., vol. 45, pp. 1327-1337, Oct. 1997.*

Choi, "Frame synchronization in the presence of frequency offset," IEEE Trans. Commun., vol. 50, pp. 1062-1065, Jul. 2002.*

Speth, "Frame synchronization of OFDM systems in frequency selective fading channels" Vehicular Technology Conference, 1997 IEEE 47th vol. 3, May 4-7, 1997, pp.1807-1811 vol. 3.*

ETSI, Digital video broadcasting (DVB); framing structure, channel coding and modulation for digital terrestrial television, ETSI EN 300 744 V1.5.1 (Nov. 2004), European Telecommunications Standards Institute (this reference can be found in www.etsi.org.*

ETSI, Digital video broadcasting (DVB); transmission system for handheld terminals (DVB-H), ETSI EN 302 304 V1.1.1 (Nov. 2004), European Telecommunications Standards Institute (this reference can be found in www.etsi.org.*

ETSI, Digital video broadcasting (DVB); DVB specification for data broadcasting, ETSI EN 301 192 V1.4.1 (Nov. 2004), European Telecommunications Standards Institute (this reference can be found in www.etsi.org.*

ETSI, Digital video broadcasting (DVB); Specification for service information (SI) in DVB systems, ETSI EN 300 468 V1.6.1 (Nov. 2004), European Telecommunications Standards Institute (this reference can be found in www.etsi.org.*

ETSI, Digital video broadcasting (DVB); DVB mega-frame for single frequency network (SFN) synchronization, ETSI TS 101 191 V1.4.1 (Jun. 2004), European Telecommunications Standards Institute (this reference can be found in www.etsi.org.*

ETSI, Digital video broadcasting (DVB); transmission to handheld terminals (DVB-H); validation task force report VTF, ETSI TR 102 401 V1.1.1 (Apr. 2005), European Telecommunications Standards Institute (this reference can be found in www.etsi.org.*

ETSI, Digital video broadcasting (DVB); DVB-H implementation guidelines, ETSI TR 102 377 V1.1.1 (Feb. 2005), European Telecommunications Standards Institute (this reference can be found in www.etsi.org.*

Palin, "Symbol synchronization in OFDM system for time selective channel conditions, "the 6th IEEE International Conference on Electronics, Circuits and Systems, 1999. Proceedings of ICECS '99, Vol. 3 Publication Year: 1999, pp. 1581-1584 vol. 3.*

Palin, "Symbol synchronization in DVB-T system in mobile environment," International Conference on Consumer Electronics, 1999, ICCE, Digital Object Publication Year: 1999, pp. 180-181.*

Parviainen, "Novel Radio Channel Models for Evaluation of DVB-H Broadcast Systems" 2006 IEEE 17th International Symposium on Personal, Indoor and Mobile Radio Communications, Publication Year: 2006, pp. 1-5.*

Yang, "A survey of handover algorithms in DVB-H," Communications Surveys & Tutorials, IEEE Vol. 8, Issue: 4 Publication Year: 2006, pp. 16-29.*

Vare, "Soft handover in terrestrial broadcast networks," 2004 IEEE International Conference on Mobile Data Management, 2004, Proceedings, Publication Year: 2004, pp. 236-242.*

Henriksson, "Coach potato", Communications Engineer Vol. 2 , Issue: 4 Publication Year: 2004, pp. 28-32.*

Heon, Huh et al., "Efficient Timing and Frequency Offset Estimation in OFDM Systems," Signals, Systems and Computers, 2005, Conference Record of the 39th Asilomar Conference, Pacific Grove, California, Oct. 28.-Nov. 1, IEEE, Piscataway, NJ, USA, IEEE, Oct. 28, 2005, pp. 1480-1484.

International Search Report, Application No. PCT/IB2008/000514, dated Aug. 11, 2009.

Park, "Performance of pilot-assisted channel estimation for OFDM system under time-varying multi-path Rayleigh fading with frequency offset compensation", Vehicular Technology Conference Proceedings, 2000, VTC 2000-Spring Tokyo, 2000 IEEE 51st, vol. 2, May 15-18, 2000 pp. 1245-1249 vol. 2.

U.S. Office Action mailed Jan. 11, 2010 for U.S. Appl. No. 11/840,628.

* cited by examiner

| Pilot Symbol 1 coarse frequency and time synchronization, FFT, GI, and modulation fixed 1102 | Signaling Symbol 2 modulation parameters and other signaling data, FFT, GI, and modulation fixed 1104 | Signaling Symbol 3 channel esimtation and fine timing 1106 | Data Symbol 1 1108 | Data Symbol 2 1110 |

FIG. 11

DIGITAL BROADCAST SERVICE DISCOVERY CORRELATION

FIELD OF THE INVENTION

Embodiments relate generally to communications networks. More specifically, embodiments relate to digital broadcast service discover frequency domain correlation.

BACKGROUND OF THE INVENTION

Digital broadband broadcast networks enable end users to receive digital content including video, audio, data, and so forth. Using a mobile terminal, a user may receive digital content over a wireless digital broadcast network. Digital content can be transmitted in a cell within a network. A cell may represent a geographical area that may be covered by a transmitter in a communication network. A network may have multiple cells and cells may be adjacent to other cells.

A receiver device, such as a mobile terminal, may receive a program or service in a data or transport stream. The transport stream carries individual elements of the program or service such as the audio, video and data components of a program or service. Typically, the receiver device locates the different components of a particular program or service in a data stream through Program Specific Information (PSI) or Service Information (SI) embedded in the data stream. However, PSI or SI signaling may be insufficient in some wireless communications systems, such as Digital Video Broadcasting-Handheld (DVB-H) systems. Use of PSI or SI signaling in such systems may result in a sub-optimal end user experience as the PSI and SI tables carrying in PSI and SI information may have long repetition periods. In addition, PSI or SI signaling requires a large amount of bandwidth which is costly and also decreases efficiency of the system.

The first time a receiver device is used, a blind service discovery/channel search is performed. Also, when a terminal is switched off and moved to a different location, a new blind search is also performed. Usually, a mobile TV application also runs background channel search from time to time in order to detect possible new services. Unfortunately, blind service discovery is relatively slow in conventional digital video broadcast networks.

As such, relatively faster service discovery/channel search capability in digital broadcast networks would be an advancement in the art.

BRIEF SUMMARY OF THE INVENTION

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

Aspects of the invention are directed to service and channel discovery in a digital broadcast network. A pilot synchronization symbol, which has known characteristics, is included as a first symbol of digital broadcast frames. The pilot symbol, which can be decoded without having to resort to trial and error methods, contains parameters for the rest of the signal. So, the rest of the signal can be decoded without trial and error methods after the pilot symbol (and any additional synchronization symbols) is decoded. Channels containing digital video broadcast services can be efficiently detected using the known part of the signal. If the fixed known part is not found from the examined signal, then the signal will be considered a non-digital-video-broadcast signal or an empty channel, and the receiver can promptly proceed to a next channel/frequency. In this way, detecting non-digital-video-broadcast and empty channels becomes relatively fast.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 11 shows an example of a pilot/signaling symbol sequence in accordance with an aspect of the invention.

DETAILED DESCRIPTION OF THE INVENTION

Figure 1:
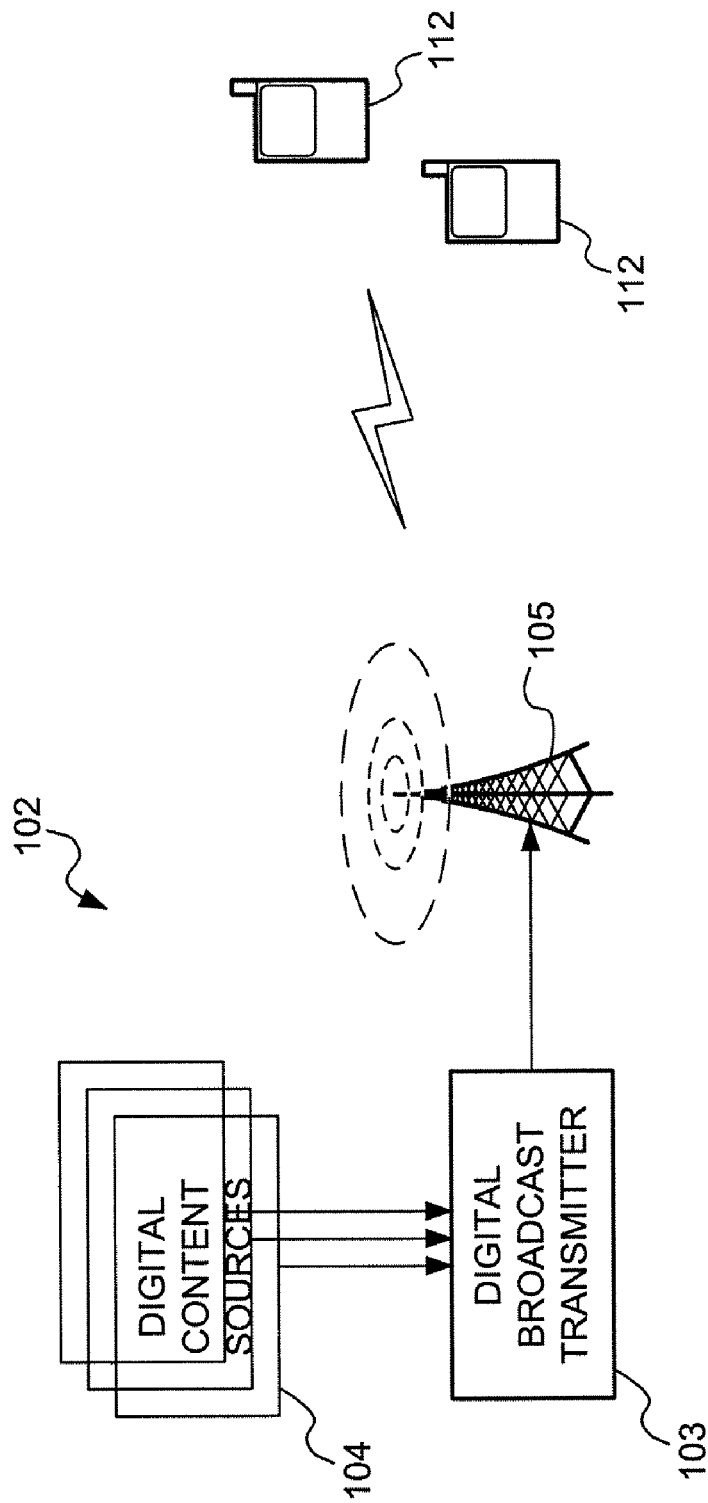
FIG. 1 illustrates a suitable digital broadband broadcast system in which one or more illustrative embodiments of the invention may be implemented.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

Embodiments are directed to service discovery and channel search in digital broadcast networks. Relatively fast service discovery is desirable from a user's point of view. Naturally, the first time receiver device is used, a blind service discovery/channel search is performed. Also, when a terminal is switched off and moved to a different location, a new blind search is also performed. Usually, a mobile TV application also runs background channel search from time to time in order to detect possible new services. The blind service discovery should only take a couple of seconds so as not to irritate the end user and to enable frequent re-scans.

The challenges related to conventional digital video broadcast service discovery include the following. The DVB-H standard offers a lot of flexibility for the signal bandwidths, FFT sizes, Guard Intervals, Inner modulations and the like. Operators may use offsets for the DVB-H signal, i.e., the signal is not at the nominal center frequency of a channel, but is offset a certain amount. Different countries use different channel raster and signal bandwidth. TPS (Transmitter Parameter Signaling) is included in the standard to help receiver synchronization and channel search. Unfortunately, the receiver needs to know several parameters before it can decode TPS information. Signal bandwidth, frequency offset, FFT size, and Guard Interval need to be known before the TPS can be decoded. Most of the channels in the UHF band do not contain DVB-H service. The non-DVB-H channels are detected with a trial-and-error method (trying to achieve lock with all modes), and that consumes a lot of time. The time to detect non-DVB-H services actually mainly sets the achievable speed for channel search because usually most of the channels are empty or contain non-DVB-H service.

An example calculation for the blind service discovery is as follows: number of channels in UHF 35, (Channels 21-55, 470-750 MHz); number of frequency offsets 7 (−3/6, −2/6, −1/6, 0, +1/6, +2/6, +3/6 MHz); number of signal bandwidths 3 (6 MHz, 7 MHz, 8 MHz. 5 MHz is separate case only for USA receivers); number of FFT sizes 3 (2K, 4K, 8K); number of Guard Intervals 4 (1/32, 1/16, 1/8 and 1/4); and average time to decode TPS for one mode 120 ms (2K 50 ms, 4K 100 ms, 8K 200 ms). The numbers are exemplary.

The resulting time for blind service discovery would be in this example: 35*7*3*3*4*120 ms=1058.4 seconds=17.64 minutes.

In accordance with embodiments, various methods may be used to reduce how long it takes to perform channel search/service discovery. The basic idea of the various methods is to introduce a part of a signal (e.g. initialization/synchronization symbol(s)), which has known characteristics and remains the same with different digital video broadcast operation modes. Therefore, the known part of the signal can be decoded without having to resort to trial and error methods. The known part of signal contains the parameters for the rest of the signal; therefore, the rest of the signal can be decoded without trial and error methods after the known part is decoded. The known part of the signal comprises a subset of available subcarriers and their modulation. The combination of the predefined subcarriers (subcarrier numbers) and their modulation is chosen so that the combination is unique for each offset-FFT size pair and which combination may be used for identifying the signal as a desired signal for the digital video broadcast. Also, the channels containing digital video broadcast services can be efficiently detected using the known part of the signal. If the fixed known part is not found from the examined signal, then the signal will be considered a non-digital-video-broadcast signal or an empty channel, and the receiver can promptly proceed to a next channel/frequency. In this way, detecting non-digital-video-broadcast and empty channels becomes relatively fast.

FIG. 1 illustrates a suitable digital broadband broadcast system 102 in which one or more illustrative embodiments may be implemented. Systems such as the one illustrated here may utilize a digital broadband broadcast technology, for example Digital Video Broadcast-Handheld (DVB-H) or next generation DVB-H networks. Examples of other digital broadcast standards which digital broadband broadcast system 102 may utilize include Digital Video Broadcast-Terrestrial (DVB-T), Integrated Services Digital Broadcasting-Terrestrial (ISDB-T), Advanced Television Systems Committee (ATSC) Data Broadcast Standard, Digital Multimedia Broadcast-Terrestrial (DMB-T), Terrestrial Digital Multimedia Broadcasting (T-DMB), Satellite Digital Multimedia Broadcasting (S-DMB), Forward Link Only (FLO), Digital Audio Broadcasting (DAB), and Digital Radio Mondiale (DRM). Other digital broadcasting standards and techniques, now known or later developed, may also be used. Aspects of the invention may also be applicable to other multicarrier digital broadcast systems such as, for example, T-DAB, T/S-DMB, ISDB-T, and ATSC, proprietary systems such as QUALCOMM MediaFLO/FLO, and non-traditional systems such 3GPP MBMS (Multimedia Broadcast/Multicast Services) and 3GPP2 BCMCS (Broadcast/Multicast Service).

Digital content may be created and/or provided by digital content sources 104 and may include video signals, audio signals, data, and so forth. Digital content sources 104 may provide content to digital broadcast transmitter 103 in the form of digital packets, e.g., Internet Protocol (IP) packets. A group of related IP packets sharing a certain unique IP address or other source identifier is sometimes described as an IP stream. Digital broadcast transmitter 103 may receive, process, and forward for transmission multiple digital content data streams from multiple digital content sources 104. In various embodiments, the digital content data streams may be IP streams. The processed digital content may then be passed to digital broadcast tower 105 (or other physical transmission component) for wireless transmission. Ultimately, mobile terminals or devices 112 may selectively receive and consume digital content originating from digital content sources 104.

Figure 2:
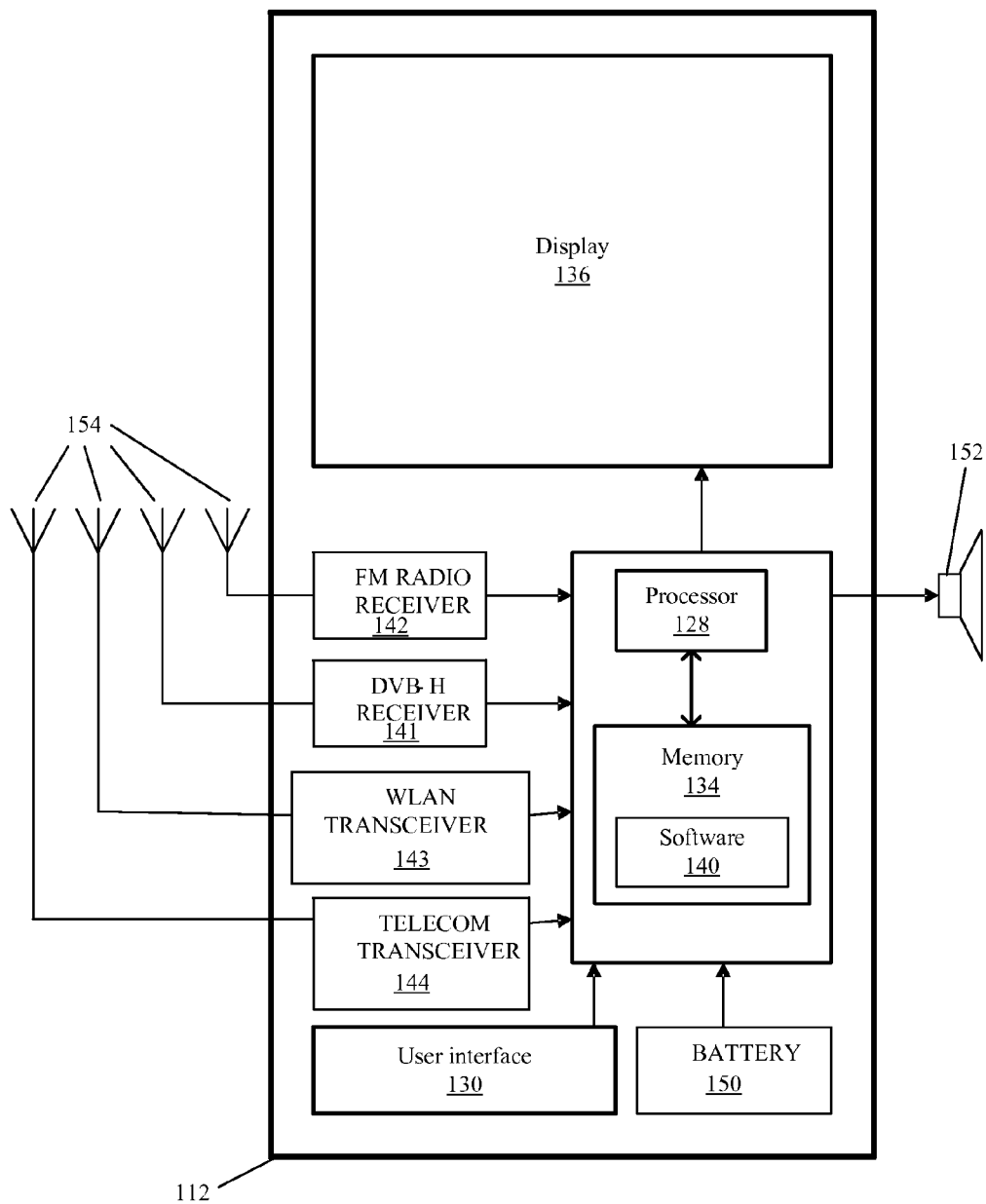
FIG. 2 illustrates an example of a mobile device in accordance with an aspect of the present invention.

As shown in FIG. 2, mobile device 112 may include processor 128 connected to user interface 130, memory 134 and/or other storage, and display 136, which may be used for displaying video content, service guide information, and the like to a mobile-device user. Mobile device 112 may also include battery 150, speaker 152 and antennas 154. User interface 130 may further include a keypad, touch screen, voice interface, one or more arrow keys, joy-stick, data glove, mouse, roller ball, touch screen, or the like.

Computer executable instructions and data used by processor 128 and other components within mobile device 112 may be stored in a computer readable memory 134. The memory may be implemented with any combination of read only memory modules or random access memory modules, optionally including both volatile and nonvolatile memory. Software 140 may be stored within memory 134 and/or storage to provide instructions to processor 128 for enabling mobile device 112 to perform various functions. Alternatively, some or all of mobile device 112 computer executable instructions may be embodied in hardware or firmware (not shown).

Mobile device 112 may be configured to receive, decode and process digital broadband broadcast transmissions that are based, for example, on the Digital Video Broadcast (DVB) standard, such as DVB-H or DVB-T, through a specific DVB receiver 141. The mobile device may also be provided with other types of receivers for digital broadband broadcast transmissions. Additionally, receiver device 112 may also be configured to receive, decode and process transmissions through FM/AM Radio receiver 142, WLAN transceiver 143, and telecommunications transceiver 144. In one aspect of the invention, mobile device 112 may receive radio data stream (RDS) messages.

In an example of the DVB standard, one DVB 10 Mbit/s transmission may have 200, 50 kbit/s audio program channels or 50, 200 kbit/s video (TV) program channels. The mobile device 112 may be configured to receive, decode, and process transmission based on the Digital Video Broadcast-Handheld (DVB-H) standard or other DVB standards, such as DVB-MHP, DVB-Satellite (DVB-S), or DVB-Terrestrial (DVB-T). Similarly, other digital transmission formats may alternatively be used to deliver content and information of availability of supplemental services, such as ATSC (Advanced Television Systems Committee), NTSC (National Television System Committee), ISDB-T (Integrated Services Digital Broadcasting-Terrestrial), DAB (Digital Audio Broadcasting), DMB (Digital Multimedia Broadcasting), FLO (Forward Link Only) or DIRECTV. Additionally, the digital transmission may be time sliced, such as in DVB-H technology. Time-slicing may reduce the average power consumption of a mobile terminal and may enable smooth and seamless handover. Time-slicing entails sending data in bursts using a higher instantaneous bit rate as compared to the bit rate required if the data were transmitted using a traditional streaming mechanism. In this case, the mobile device 112 may have one or more buffer memories for storing the decoded time sliced transmission before presentation.

In addition, an Electronic Service Guide (ESG) may be used to provide program or service related information. Generally, an Electronic Service Guide (ESG) enables a terminal to communicate what services are available to end users and how the services may be accessed. The ESG includes independently existing pieces of ESG fragments. Traditionally, ESG fragments include XML and/or binary documents, but more recently they have encompassed a vast array of items, such as for example, a SDP (Session Description Protocol) description, textual file, or an image. The ESG fragments describe one or several aspects of currently available (or future) service or broadcast program. Such aspects may include for example: free text description, schedule, geographical availability, price, purchase method, genre, and supplementary information such as preview images or clips. Audio, video and other types of data including the ESG fragments may be transmitted through a variety of types of networks according to many different protocols. For example, data can be transmitted through a collection of networks usually referred to as the "Internet" using protocols of the Internet protocol suite, such as Internet Protocol (IP) and User Datagram Protocol (UDP). Data is often transmitted through the Internet addressed to a single user. It can, however, be addressed to a group of users, commonly known as multicasting. In the case in which the data is addressed to all users it is called broadcasting.

One way of broadcasting data is to use an IP datacasting (IPDC) network. IPDC is a combination of digital broadcast and Internet Protocol. Through such an IP-based broadcasting network, one or more service providers can supply different types of IP services including on-line newspapers, radio, and television. These IP services are organized into one or more media streams in the form of audio, video and/or other types of data. To determine when and where these streams occur, users refer to an electronic service guide (ESG). One type of DVB is Digital Video Broadcasting-handheld (DVB-H). The DVB-H is designed to deliver 10 Mbps of data to a battery-powered terminal device.

DVB transport streams deliver compressed audio and video and data to a user via third party delivery networks. Moving Picture Expert Group (MPEG) is a technology by which encoded video, audio, and data within a single program is multiplexed, with other programs, into a transport stream (TS). The TS is a packetized data stream, with fixed length packets, including a header. The individual elements of a program, audio and video, are each carried within packets having a unique packet identification (PID). To enable a receiver device to locate the different elements of a particular program within the TS, Program Specific Information (PSI), which is embedded into the TS, is supplied. In addition, additional Service Information (SI), a set of tables adhering to the MPEG private section syntax, is incorporated into the TS. This enables a receiver device to correctly process the data contained within the TS.

As stated above, the ESG fragments may be transported by IPDC over a network, such as for example, DVB-H to destination devices. The DVB-H may include, for example, separate audio, video and data streams. The destination device must then again determine the ordering of the ESG fragments and assemble them into useful information.

Figure 3:
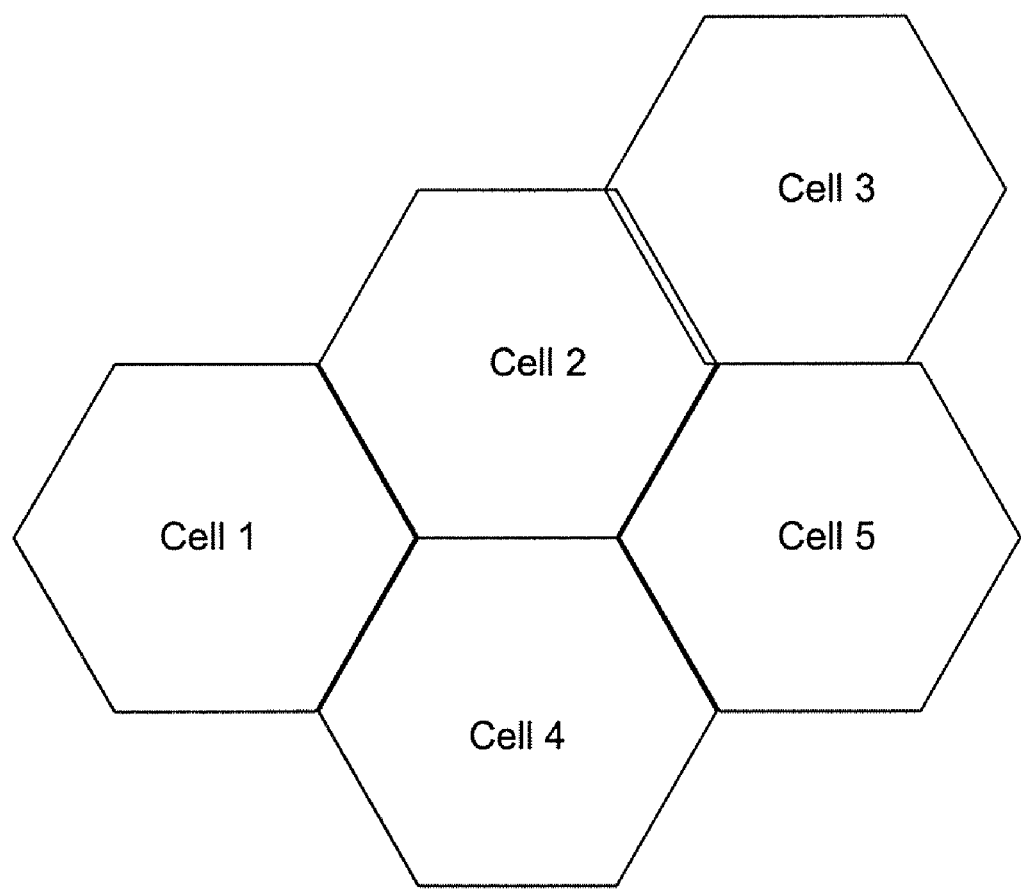
FIG. 3 illustrates an example of cells schematically, each of which may be covered by a different transmitter in accordance with an aspect of the present invention.

In a typical communication system, a cell may define a geographical area that may be covered by a transmitter. The cell may be of any size and may have neighboring cells. FIG. 3 illustrates schematically an example of cells, each of which may be covered by a different transmitter. In this example, Cell 1 represents a geographical area that is covered by a transmitter for a communication network. Cell 2 is next to Cell 1 and represents a second geographical area that may be covered by a different transmitter. Cell 2 may, for example, be a different cell within the same network as Cell 1. Alternatively, Cell 2 may be in a network different from that of Cell 1. Cells 1, 3, 4, and 5 are neighboring cells of Cell 2, in this example.

In accordance with one or more embodiments, data used in channel searches and service discovery is signaled using symbols at least in the beginning of a data frame carrying multimedia and other data for services. In other embodiments, one or more of these symbols may also be inserted within the data frames. Further, one or more of these symbols may be inserted at the beginning of, and/or within, a superframe composed of two or more data frames.

In one embodiment, the symbols comprise a first symbol that can be used for identifying that the signal is of the desired type. Further, the first symbol may be used for detecting an offset from the radio channel center frequency. The symbols may comprise a second symbol that may carry data relating to the modulation parameters that are used in subsequent data symbols. In another embodiment, the symbols comprise a third symbol that may be used for channel estimation.

Figure 4:
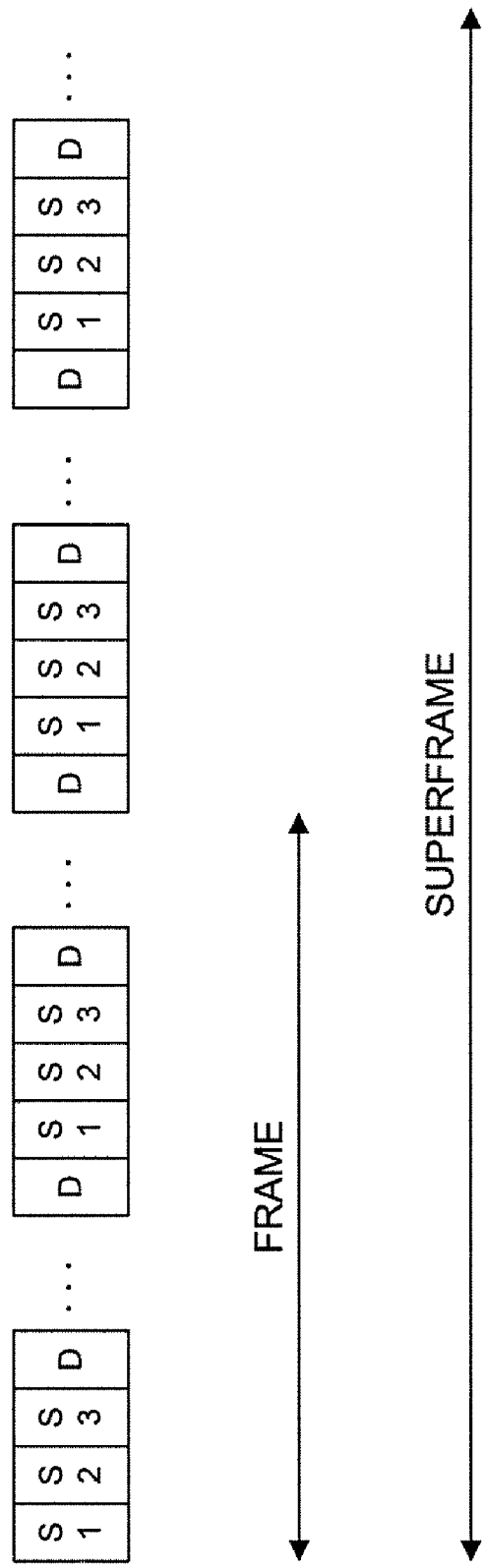
FIG. 4 shows a frame and superframe of symbols, synchronization symbols used for channel searches and service discovery, and data in accordance with an aspect of the invention.

FIG. 4 shows a frame and superframe of symbols, synchronization symbols, S1-S3, used for channel searches and service discovery, and data D in accordance with an aspect of the invention.

In various digital broadcast networks, a multicarrier signal may be positioned relative to the channel raster so that the signal center frequency (SCF) coincides with the channel center frequency (CCF), or it may be offset from the channel center frequency. The signal center frequency may be offset due to frequency spectrum use reasons (e.g. interference from a neighboring channel). For the first symbol, not all available subcarriers are used. In various embodiments, the subcarriers that are selected for the first symbol may be evenly spaced and may be symmetrically positioned with regard to the channel center frequency or the offset signal frequency.

Figure 5:
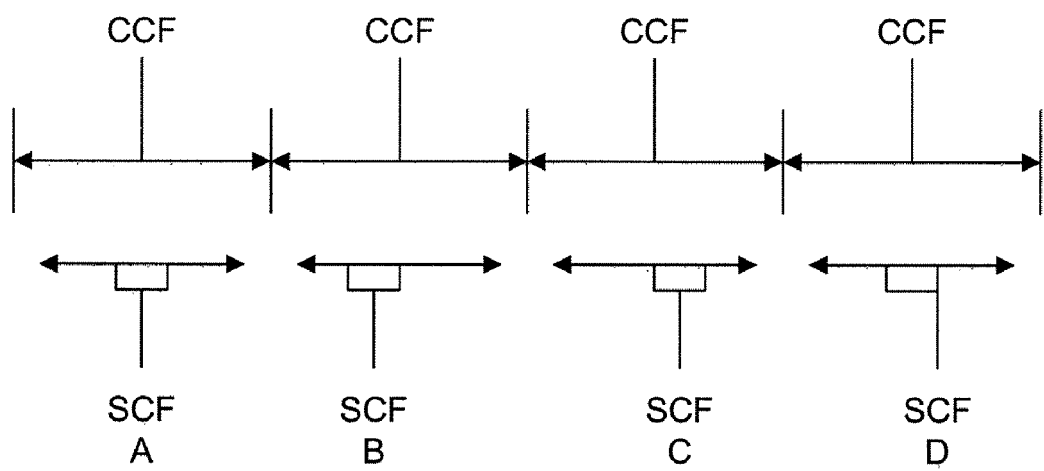
FIG. 5 shows how a signal center frequency may coincide with, or be offset relative to, a channel center frequency.

FIG. 5 shows how a signal center frequency may coincide with, or be offset relative to, a channel center frequency (CCF). In FIG. 5, SCF A and its corresponding CSF coincide, SCF B and SCF C are offset with regard to the corresponding CSFs. The rectangles in FIG. 5 illustrate the subcarriers selected for the first symbol from the available subcarriers. For SCF A, SCF B, and SCF C, the selected subcarriers are centered around the respective SCFs. The selected subcarriers for SCF D, however, are centered around the CCF, as opposed to the SCF.

For the first symbol used for channel searches and service discovery, the subcarriers may be selected so that they may be found irrespective of the offset. In the first symbol, a fixed Fast Fourier Transform (FFT) may be used. The fixed FFT may be selected from the available FFT sizes that in present digital video broadcast systems include 2K, 4K, 8K, but may also include 1K at the lower end and 16K at the higher end. In one embodiment, the lowest available FFT is used. Further, the first symbol may use a fixed guard interval (GI) that may be selected from the GIs used for the symbols carrying data. The first symbol may, in one embodiment, have no guard interval.

The number of subcarriers for the first symbol may be less than half of the available subcarriers.

When the first symbol is used for channel offset signaling, the carriers may be modulated using Binary Phase Shift Keying (BPSK) or Quadrature Phase Shift Keying (QPSK). The selected pilot pattern may be different for different channel offset values, and the pilot pattern and subcarrier modulation may be selected, in one embodiment, so that the different pilot patterns are orthogonal to each other and differ from each other maximally thus allowing robustness in detection.

For the second (and third, if present) symbol the full signal bandwidth (substantially all available carriers) may be used. In an embodiment, the second (and third) symbol may use the same FFT size and guard interval as the first symbol. In some embodiments, not all of the available subcarriers are used for the second (and third) symbols. In one embodiment, the second and third symbol may have the same subcarriers as pilot subcarriers and, in a further embodiment, have additional subcarriers used as pilots. In one embodiment, the second symbol also carries signaling data and, further, may carry forward error correction data (FEC) for the signaling data.

In accordance with embodiments, a part of a signal (e.g. initialization/synchronization symbol(s)) in introduced that has known characteristics and remains the same with different digital video broadcast operation modes. The known part of signal contains parameters for the rest of the signal; therefore, the rest of the signal can be decoded without trial and error methods after the known part is decoded. Also, the channels containing digital video broadcast services can be efficiently detected using the known part of the signal. If the fixed known part is not found from the examined signal, then the signal will be considered a non-digital-video-broadcast signal or an empty channel, and the receiver can promptly proceed to a next channel/frequency.

Figure 6:
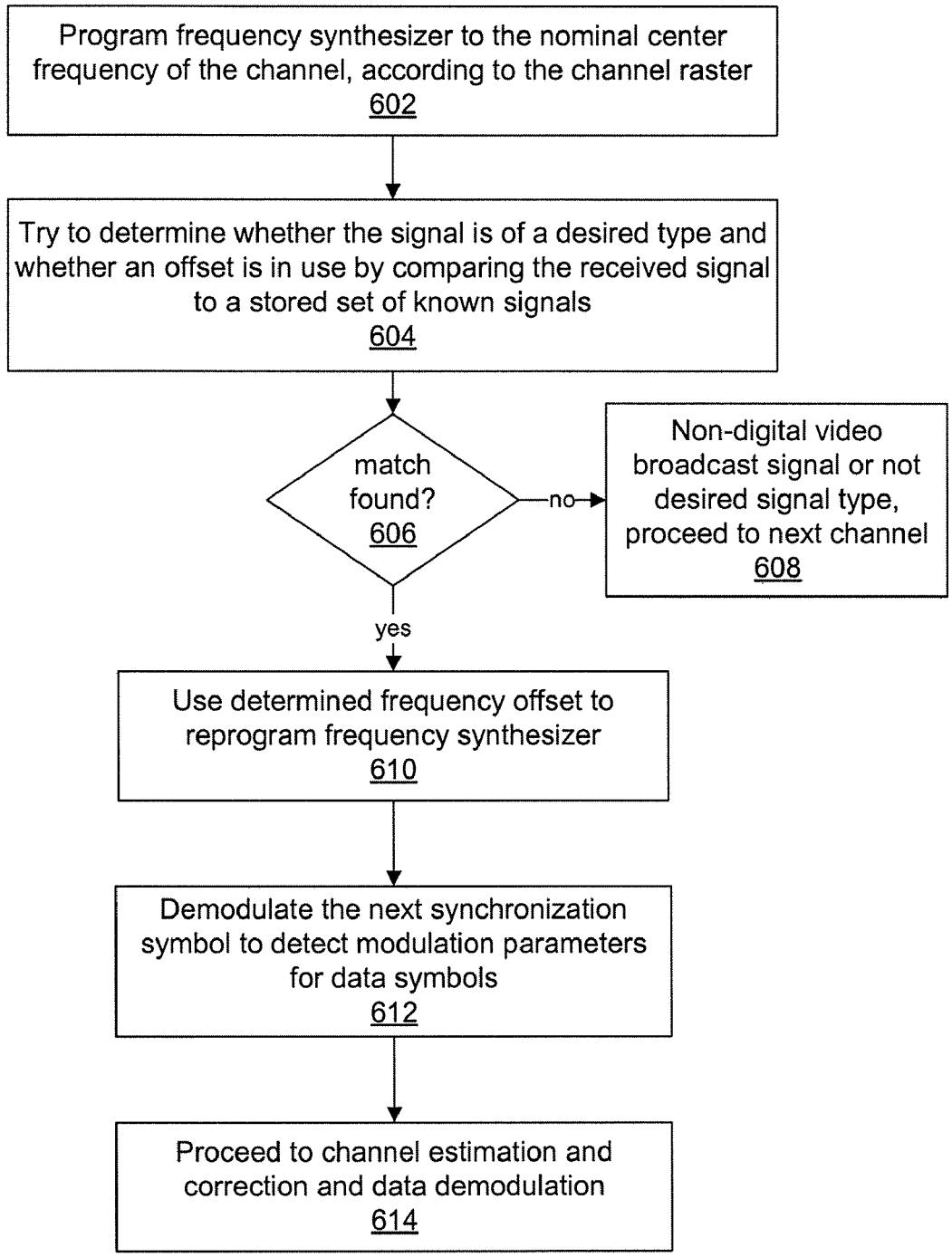
FIG. 6 is a flow chart showing steps performed by a receiver in accordance with at least one embodiment.

FIG. 6 is a flow chart showing steps performed by a receiver in accordance with at least one embodiment. A frequency synthesizer in the receiver is programmed to the nominal center frequency of the channel, according to the channel raster, as shown at 602 for receiving a signal on the channel. An attempt is made to determine whether the received signal is of a desired type and whether an offset is in use by comparing the received signal to a stored set of known signals, as shown at 604. If a match is found, the signal is determined to be of the desired type and the offset and FFT size for the signal can be determined. A determination is made with respect to whether a match was detected, as shown at 606. If a match is not detected, then the "no" branch from 606 is followed, the channel is considered to contain a non-digital-video-broadcast signal or the received signal is not of the desired type, and processing proceeds to the next channel, as shown at 608.

Otherwise, if a match is detected, then the "yes" branch from 606 is followed, the determined frequency offset is used for reprogramming the frequency synthesizer, as shown at 610. The next synchronization symbol is demodulated to detect modulation parameters for data symbols, as shown at 612. Finally, channel estimation and correction and data demodulation are then performed, as shown at 614.

In case the reprogramming of the frequency synthesizer takes a relatively long time, the receiver may wait for the next set of initialization/synchronization symbols and demodulate the modulation parameters from that set.

Figure 7:
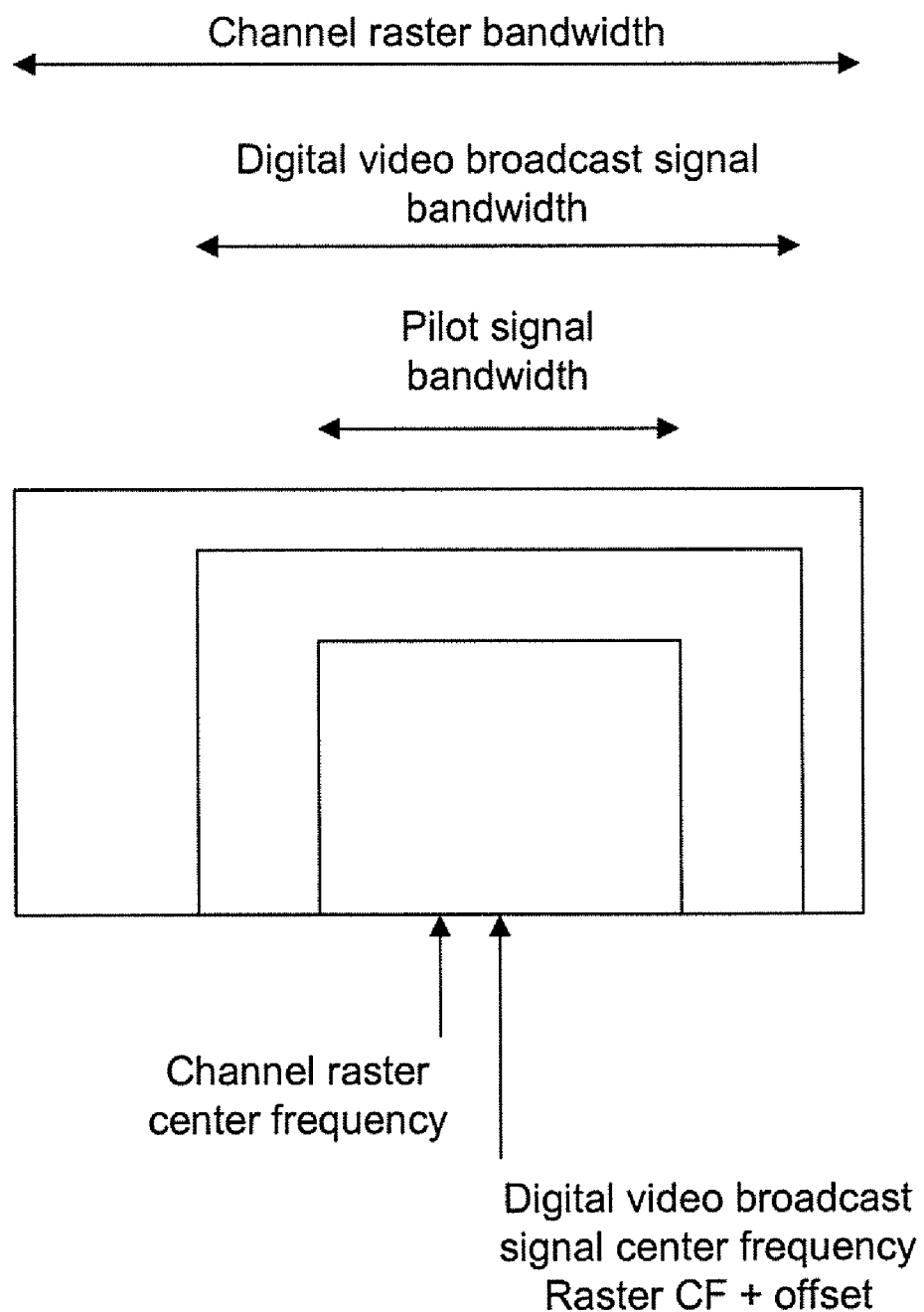
FIG. 7 shows an example of the size of a pilot signal bandwidth relative to a signal bandwidth and a channel raster bandwidth in accordance with an aspect of the invention.

FIG. 7 shows an example of the size of a pilot signal bandwidth relative to a signal bandwidth and a channel raster bandwidth in accordance with an aspect of the invention. In an embodiment, the first symbol is a pilot symbol for coarse frequency and timing synchronization. The bandwidth of the pilot symbol is smaller than the actual data symbol, e.g. in 8 MHz data symbol case, the pilot symbol could be 7 MHz wide. The pilot symbol center frequency may be the same as the frequency for the data symbols, i.e., in case an offset is used for data symbols, the offset may also be used for the pilot symbol. With the pilot symbol's smaller bandwidth, the receiver's RF part can be programmed to the nominal channel center frequency during the initial synchronization phase and still be set to receive the pilot symbol's whole bandwidth. Without the pilot symbol's smaller bandwidth, the receiver's RF channel selection filter would filter out part of the pilot symbol.

In an embodiment, the pilot symbol may use known (fixed) FFT and Guard Interval selection. Also the number of used pilots may be different than for data symbols, i.e., part of the pilots can be extinguished, e.g., 256 pilots could be used. The pilots may be modulated with a known sequence.

Figure 8:
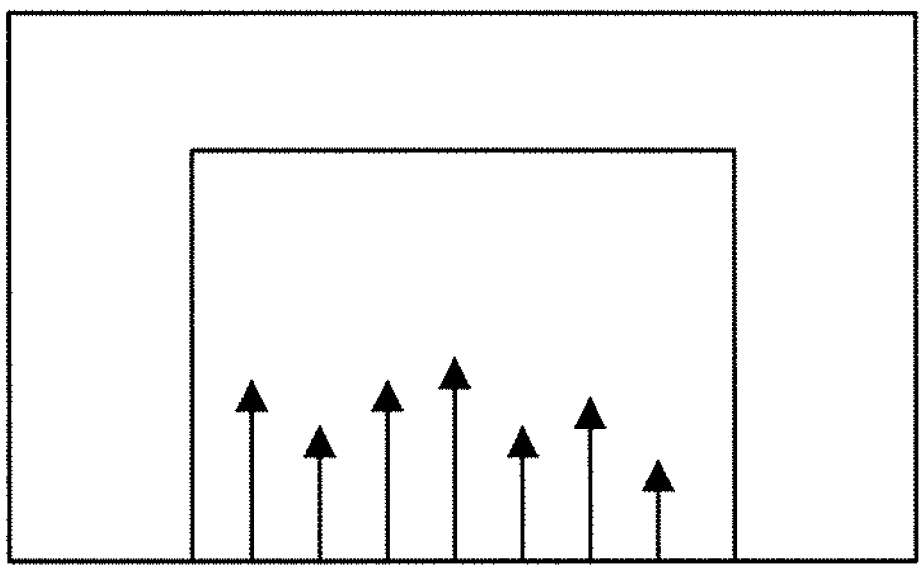
FIG. 8 illustrates sparse pilot spacing of a pilot sequence for a pilot symbol in accordance with an aspect of the invention.

FIG. 8 illustrates sparse pilot spacing of a pilot sequence for a pilot symbol in accordance with an aspect of the invention. The modulation sequence "finger print" for the pilot pattern may be known by the receiver. In addition to modulation, the subcarriers in the pilot symbols may also have different boosting levels, as illustrated in FIG. 8.

Figure 9:
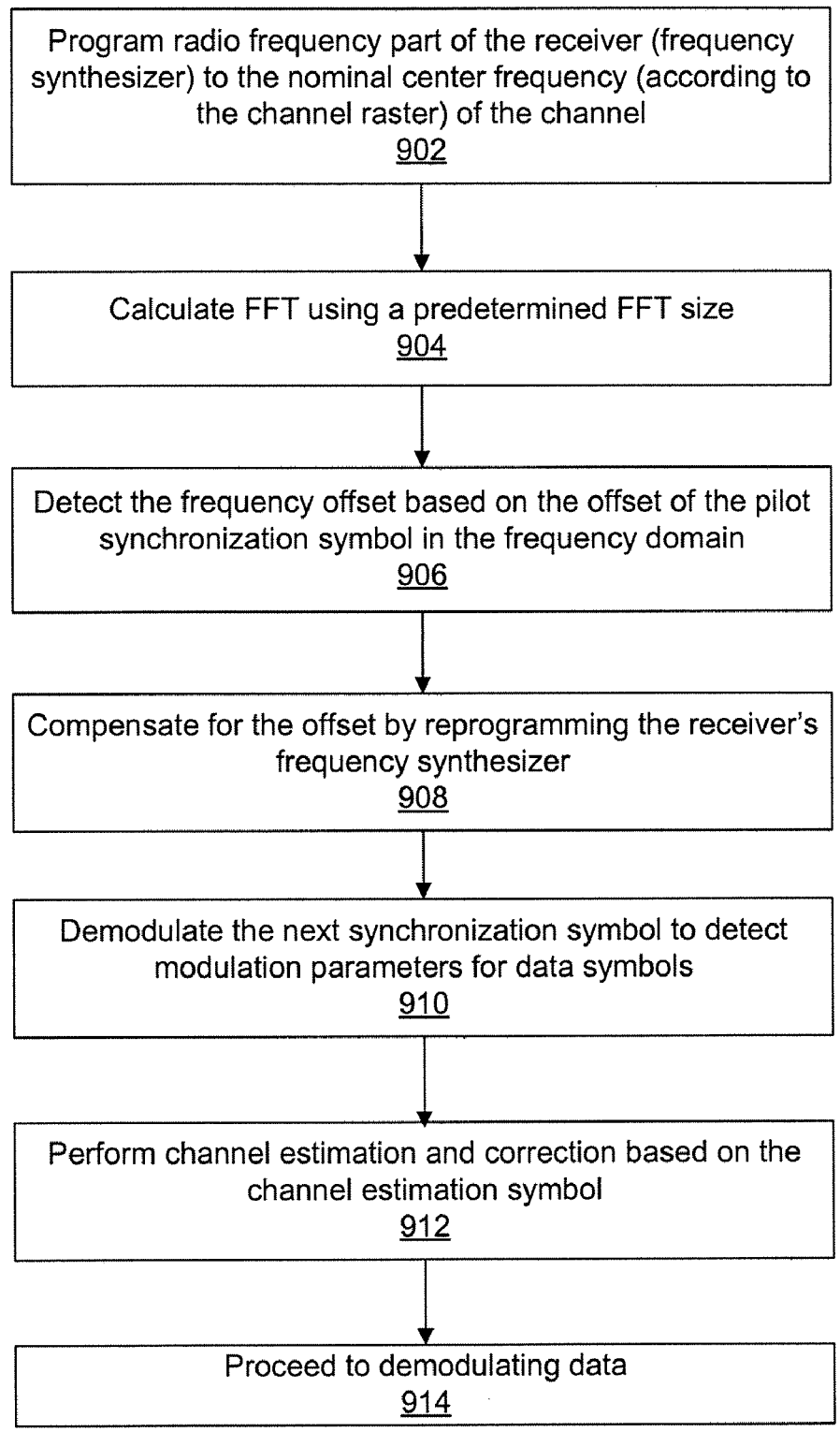
FIG. 9 is a flowchart showing steps performed by a receiver for performing correlation in the frequency domain to detect the coarse offset being used.

FIG. 9 is a flowchart showing steps performed by a receiver for performing correlation in the frequency domain to detect the coarse offset being used. A radio frequency part of the receiver (frequency synthesizer) is programmed to the nominal center frequency (according to the channel raster) of the channel, as shown at 902.

An FFT is calculated using a predetermined FFT size as shown at 904. The width of the pilot symbol is smaller than the channel bandwidth. Therefore, the FFT is able to capture the pilot symbol even when an initial setting for frequency synthesizer is wrong because of the offset.

The frequency offset is detected based on the offset of the pilot synchronization symbol in the frequency domain, as shown at 906. If non-correlation in the frequency domain is found, then the signal is not a digital video broadcast signal and channel search can proceed to the next channel.

The offset is compensated for by reprogramming the receiver's frequency synthesizer, as shown at 908. The next synchronization symbol is demodulated to detect modulation parameters for data symbols, as shown at 910. Channel estimation and correction based on the channel estimation symbol is performed, as shown at 912, and then data is demodulated as shown at 914. In an embodiment the receiver may wait for a synchronization symbol in the next set of synchronization symbols thus allowing the frequency synthesizer to be reprogrammed to the signal center frequency.

Different pilot sequences (finger prints) may be used based on the offset in use. For example, if 7 offsets are possible (±⅜

MHz, ±⅖ MHz, ±⅙ MHz, 0), 7 different pilot sequences may be introduced. Several methods can be utilized to construct the pilot sequence including, but not limited to: pseudo random sequence, inverting every second, boosting the center carrier, and the like. In accordance with an embodiment, the receiver performs a correlation in the time domain to detect the used pilot sequence, and, therefore, the offset used. The finger prints may be used in accordance with one or more embodiments directed to performing a time domain correlation. But, frequency domain embodiments, the offset can be detected by a sliding correlator in the frequency domain, that is, a single finger print may be used. Additionally, one could code information like FFT size for frequency domain embodiments if different finger prints are used for different FFT sizes, for example. Then, a frequency domain correlation could be run with several finger prints. In an embodiment, if there are several finger prints in use, the received fingerprint may be compared simultaneously to several stored finger prints. A received pilot sequence may be translated in frequency domain stepwise over the channel bandwidth, wherein a high correlation signal is produced when the pilot sequences coincide.

Figure 10:
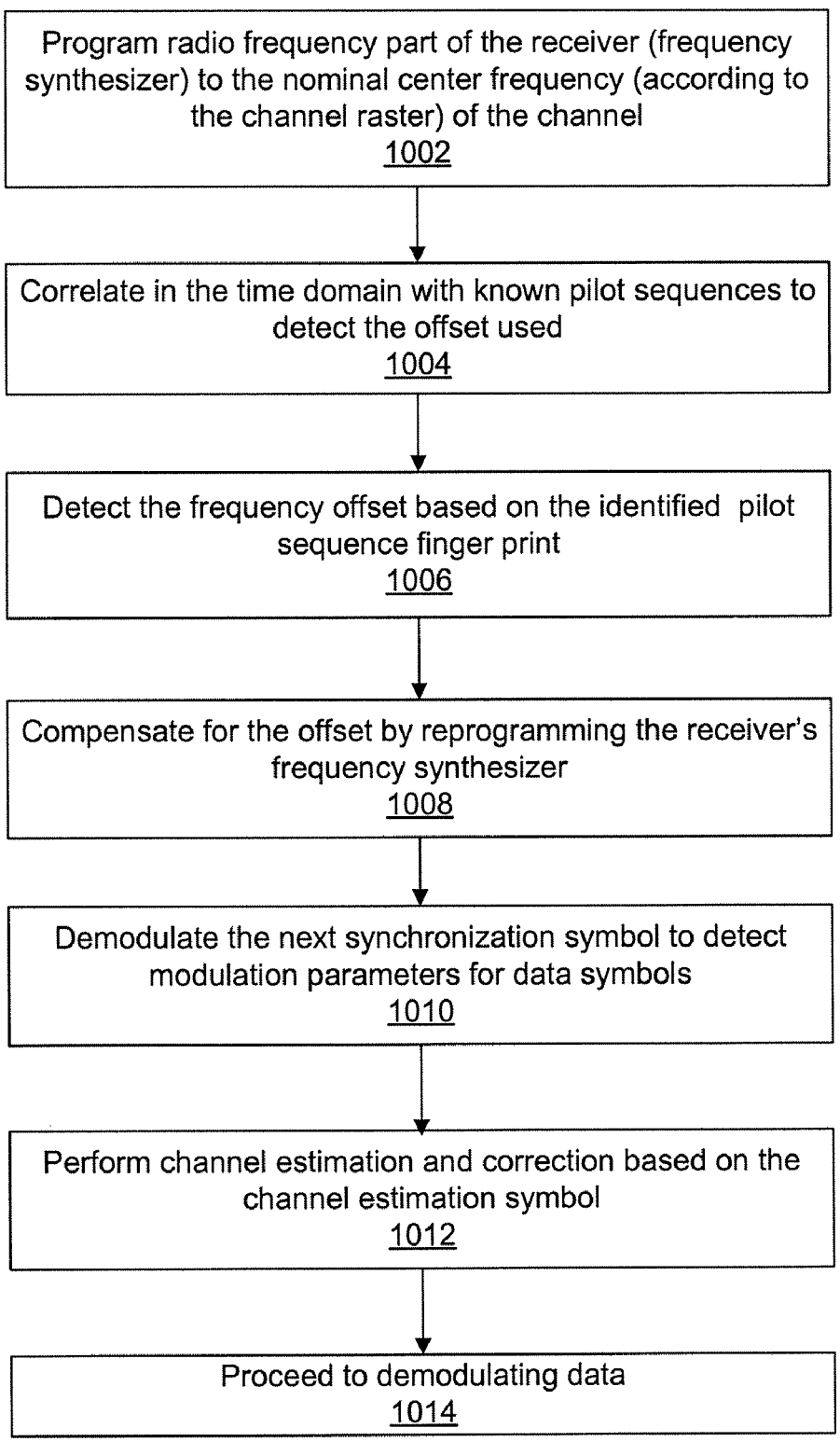
FIG. 10 is a flow chart that shows steps in accordance with an embodiment for performing a service discovery correlation in the time domain.

FIG. 10 is a flow chart that shows steps in accordance with an embodiment for performing a service discovery correlation in the time domain. A radio frequency part of the receiver (frequency synthesizer) is programmed to the nominal center frequency (according to the channel raster) of the channel, as shown at 1002.

A correlation of the received pilot sequence is performed in the time domain with known pilot sequences to detect the offset used, as shown at 1004. For examples, if seven offsets are in use, seven different pilot sequences (finger prints) are defined. Each coarse offset corresponds to a particular pilot sequence finger print. Based on the correlation, the finger print used, i.e., the offset used, can be detected. The pilot sequence will be in the nominal center frequency of the channel (according to the channel raster). In one embodiment a set of pilot symbols are defined so that each of them corresponds to a frequency offset-FFT size pair, wherein a based on the detected correlation both the offset and FFT size can be detected.

The frequency offset is detected based on the identified pilot sequence finger print, as shown at 1006. If none of the pilot sequences show correlation, then the signal is not a desired digital video broadcast signal, and search can proceed to the next channel.

The offset is compensated for by reprogramming the receiver's frequency synthesizer, as shown at 1008. The next synchronization symbol is demodulated to detect modulation parameters for data symbols, as shown at 1010. Channel estimation and correction based on the channel estimation symbol is performed, as shown at 1012, and then data is demodulated as shown at 1014. In one embodiment the receiver may wait for a next set of synchronization symbols for allowing the frequency synthesizer to be reprogrammed.

After the offset has been found and the frequency synthesizer is reprogrammed, the second symbol (i.e., the symbol following the pilot symbol) may use fixed FFT and Guard Interval selection, but would use the full signal bandwidth. The second symbol may then contain specific information about the modulation parameters for the subsequent data symbols. In another embodiment the second symbol may use the FFT that is signaled in the first symbol.

An optional third symbol could be inserted before the data symbols to facilitate channel estimation.

FIG. 11 shows an example of a pilot/signaling symbol sequence in accordance with an aspect of the invention. The pilot symbol 1102 and the Signaling Symbols 1104 and 1106 may be repeated in the transmission frequently enough, e.g., every 50 ms, to enable signal detection and synchronization as fast as is desired. The first pilot symbol 1102 is used for coarse frequency and time synchronization, and, in addition, it may also carry information on the FFT size for the following symbols. The FFT, guard interval, and the modulation are fixed for the first symbol. In one embodiment the second symbol 1104 comprises the same pilot subcarriers as the first symbol but may, in addition, have more subcarriers that are used as pilot subcarriers. The second signaling symbol also carries signaling data comprising FFT size, guard interval, and modulation parameters. The third signaling symbol comprises still more pilots that are used for channel estimation and fine timing.

The modulation parameter for data symbols 1108 and 1110 (like constellation, QPSK vs. 16 QAM vs. 64 QAM) may be varied frequently because the repeated signaling symbols carry information about the selected parameters.

Figure 12:
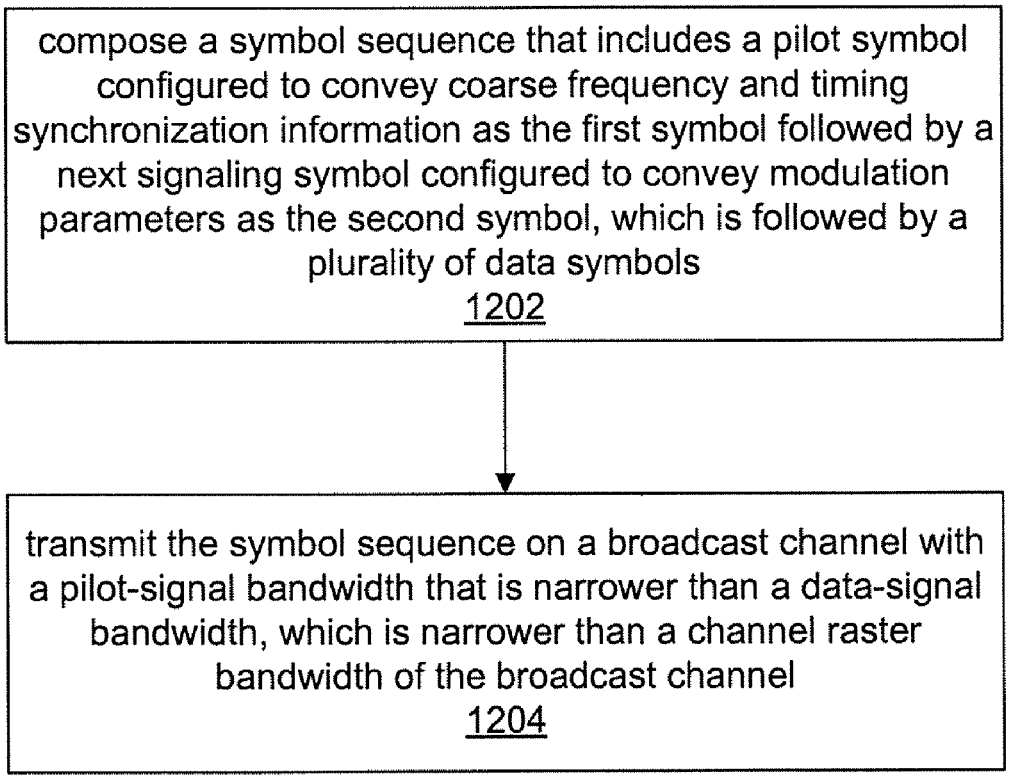
FIG. 12 is a flowchart showing steps of a method performed by a transmitter in accordance with at least one aspect of the invention.

FIG. 12 is a flowchart showing steps of a method performed by a transmitter in accordance with at least one aspect of the invention. A symbol sequence is composed that includes a pilot symbol configured to convey coarse frequency and timing synchronization information as the first symbol followed by a next signaling symbol configured to convey modulation parameters as the second symbol, which is followed by a plurality of data symbols, as shown at 1202. In one embodiment the second signaling symbol may be followed by a third signaling symbol. The symbol sequence is then transmitted on a broadcast channel with a pilot-signal bandwidth that may be narrower than a data-signal bandwidth, which further may be narrower than a channel raster bandwidth of the broadcast channel, as shown at 1204.

In accordance with one or more embodiments, channel search times are typically relatively low, e.g., a couple of seconds. If the pilot-symbol repetition rate is 50 ms, the average time for 3 bandwidths (6, 7 and 8 MHz) is around 35*3*50 ms=5.25 s. The different bandwidths are searched separately because the channel raster center frequencies are different.

One or more aspects of the invention may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), application specific integrated circuits (ASIC), and the like.

Embodiments include any novel feature or combination of features disclosed herein either explicitly or any generalization thereof. While embodiments have been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A method comprising:
   programming a digital broadcast receiver's frequency synthesizer to a nominal center frequency of a broadcast channel;
   receiving a pilot symbol on the programmed frequency;
   correlating the received pilot symbol in a frequency domain with one or more stored pilot symbols in the receiver;
   in response to finding correlation in the frequency domain,
      correcting a frequency offset by reprogramming the receiver's frequency synthesizer, and
      demodulating a next synchronization symbol that follows the pilot symbol in a digital broadcast frame to detect modulation parameters for data symbols of the broadcast channel, wherein the data symbols follow the next synchronization symbol in the digital broadcast frame and wherein the pilot symbol does not convey the modulation parameters.

2. The method of claim 1, wherein the pilot symbol is a first symbol of the digital broadcast frame.

3. The method of claim 1, wherein a bandwidth of the pilot symbol is smaller than a bandwidth of the data symbols on the broadcast channel.

4. The method of claim 1, wherein a center frequency of the pilot symbol is substantially the same as a frequency for the data symbols on the broadcast channel.

5. The method of claim 1, further comprising demodulating an additional synchronization symbol to obtain channel estimation information.

6. A method comprising:
   programming a digital broadcast receiver's frequency synthesizer to a nominal center frequency of a broadcast channel;
   receiving a first symbol of a digital broadcast frame on the programmed frequency;
   correlating in a time domain the first symbol of the received digital broadcast frame with a plurality of known pilot sequences to identify a pilot sequence finger print in use on the broadcast channel;
   in response to identifying a pilot sequence based on correlating in the time domain with a plurality of known pilot sequences,
      detecting an offset in use on the broadcast channel based on the identified pilot sequence finger print,
      reprogramming the receiver's frequency synthesizer with the detected frequency offset, and
      demodulating a next synchronization symbol that follows the first symbol in the digital broadcast frame to detect modulation parameters for data symbols of the broadcast channel, wherein the data symbols fellow the next synchronization symbol in the digital broadcast frame and wherein the first symbol does not convey the modulation parameters.

7. The method of claim 6, wherein each of a plurality of potential frequency offsets corresponds to a known pilot sequence.

8. The method of claim 6, wherein the first symbol of the received digital broadcast frame is a pilot symbol that has a bandwidth that is smaller than a bandwidth of data symbols on the broadcast channel.

9. The method of claim 6, wherein a center frequency of the first symbol of the received digital broadcast frame is the same as a frequency for the data symbols on the broadcast channel.

10. The method of claim 6, further comprising demodulating an additional synchronization symbol to obtain channel estimation information.

11. An apparatus comprising:
   a processor; and
   a computer readable medium containing computer executable instructions that, when executed by the processor, cause the apparatus to at least perform:
   program a digital broadcast receiver's frequency synthesizer to a nominal center frequency of a broadcast channel;
   receive a pilot symbol on the programmed frequency;
   correlate the received pilot symbol in a frequency domain with one or more stored pilot symbols in the receiver;
   in response to finding correlation in the frequency domain,
      correct a frequency offset by reprogramming the receiver's frequency synthesizer, and
      demodulate a next synchronization symbol that follows the pilot symbol in a digital broadcast frame to detect modulation parameters for data symbols of the broadcast channel, wherein the data symbols follow the next synchronization symbol in the digital broadcast frame and wherein the pilot symbol does not convey the modulation parameters.

12. The apparatus of claim 11, wherein the pilot symbol is a first symbol of the digital broadcast frame.

13. The apparatus of claim 11, wherein a bandwidth of the pilot symbol is smaller than a bandwidth of the data symbols on the broadcast channel.

14. The apparatus of claim 11, wherein a center frequency of the pilot symbol is substantially the same as a frequency for the data symbols on the broadcast channel.

15. The apparatus of claim 11, wherein the computer executable instructions, when executed by the processor, cause the apparatus to demodulate an additional synchronization symbol to obtain channel estimation information.

16. An apparatus comprising:
   a processor: and
   a computer readable medium containing computer executable instructions that, when executed by the processor, cause the apparatus to at least perform:
   program a digital broadcast receiver's frequency synthesizer to a nominal center frequency of a broadcast channel;
   receive a first symbol of a digital broadcast frame on the programmed frequency;
   correlate in a time domain the first symbol with a plurality of known pilot sequences to identify a pilot sequence finger print in use on the broadcast channel;
   in response to identifying a pilot sequence based on correlating in the time domain with a plurality of known pilot sequences,
      detect an offset in use on the broadcast channel based on the identified pilot sequence finger print,
      correct the frequency offset by reprogramming the receiver's frequency synthesizer,
      demodulate a next synchronization symbol that follows the first symbol in the digital broadcast frame to detect modulation parameters for data symbols of the broadcast channel, wherein the data symbols follow the next synchronization symbol in the digital broadcast frame and wherein the first symbol does not convey the modulation parameters.

17. The apparatus of claim 16, wherein each of a plurality of potential frequency offsets corresponds to a known pilot sequence.

18. The apparatus of claim 16, wherein the first symbol is a pilot symbol that has a bandwidth that is smaller than a bandwidth of data symbols on the broadcast channel.

19. The apparatus of claim 16, wherein a center frequency of the first symbol is the same as a frequency for the data symbols on the broadcast channel.

20. The apparatus of claim 16, wherein the computer executable instructions, when executed by the processor, cause the apparatus to demodulate an additional synchronization symbol to obtain channel estimation information.

21. A method comprising:
composing, by a processor, a symbol sequence that includes a pilot symbol configured to convey coarse frequency and timing synchronization information as a first symbol followed by a next signaling symbol configured to convey modulation parameters as a second symbol, which is followed by a plurality of data symbols, wherein the pilot symbol does not convey the modulation parameters; and
transmitting the symbol sequence on a broadcast channel with a pilot-signal bandwidth that is narrower than a data-signal bandwidth, which is narrower than a channel raster bandwidth of the broadcast channel.

22. The method of claim 21, wherein a center frequency used for transmitting the pilot symbol is substantially the same as a frequency used for transmitting the data symbols.

23. The method of claim 21, wherein the symbol sequence further comprises an additional signaling symbol located before the data symbols in the symbol sequence, wherein the additional signaling symbol is configured for signaling channel-estimation information.

24. The method of claim 21, wherein the pilot symbol, the next signaling symbol, and the data symbols use a predetermined fast fourier transform size and guard interval selection.

25. An apparatus comprising:
a processor; and
a computer readable medium containing computer executable instructions that, when executed by the processor, cause the apparatus at least to:
compose a symbol sequence that includes a pilot symbol configured to convey coarse frequency and timing synchronization information as a first symbol followed by a next signaling symbol configured to convey modulation parameters as a second symbol, which is followed by a plurality of data symbols, wherein the first symbol does not convey the modulation parameters, and
transmit the symbol sequence on a broadcast channel with a pilot-signal bandwidth that is narrower than a data-signal bandwidth, which is narrower than a channel raster bandwidth of the broadcast channel.

26. The apparatus of claim 25, wherein a center frequency used for transmitting the pilot symbol is substantially the same as a frequency used for transmitting the data symbols.

27. The apparatus of claim 25, wherein the symbol sequence further comprises an additional signaling symbol located before the data symbols in the symbol sequence, wherein the additional signaling symbol is configured for signaling channel-estimation information.

28. The apparatus of claim 25, wherein the pilot symbol, the next signaling symbol, and the data symbols use predetermined fast fourier transform size and guard interval selection.

* * * * *